United States Patent
Nishiura et al.

(10) Patent No.: US 6,585,288 B2
(45) Date of Patent: Jul. 1, 2003

(54) COVER OF AIRBAG DEVICE AND EMBLEM ATTACHED TO THE COVER

(75) Inventors: Shigekazu Nishiura, Tokyo (JP); Haruo Katsurada, Tokyo (JP)

(73) Assignee: Takata Corporation, Tokyo (JP)

( * ) Notice: Subject to any disclaimer, the term of this patent is extended or adjusted under 35 U.S.C. 154(b) by 28 days.

(21) Appl. No.: 09/876,086

(22) Filed: Jun. 8, 2001

(65) Prior Publication Data
US 2001/0052690 A1 Dec. 20, 2001

(30) Foreign Application Priority Data
Jun. 13, 2000 (JP) ....................... 2000-177287

(51) Int. Cl.[7] .......................... B60R 21/16; B60R 21/20
(52) U.S. Cl. ..................... 280/728.3; 280/731
(58) Field of Search ............... 280/728.3, 731; 200/61.55, 61.54

(56) References Cited

U.S. PATENT DOCUMENTS

| | | | | |
|---|---|---|---|---|
| 5,344,185 A | * | 9/1994 | Cooke, II | 280/731 |
| 5,678,849 A | * | 10/1997 | Davis | 280/728.3 |
| 6,047,984 A | * | 4/2000 | Preisler et al. | 280/728.2 |
| 6,053,526 A | * | 4/2000 | Preisler et al. | 280/728.2 |
| 6,149,186 A | * | 11/2000 | Manfrin | 280/728.2 |
| 6,158,764 A | * | 12/2000 | Preisler et al. | 280/728.2 |
| 6,322,100 B1 | * | 11/2001 | Cuevas et al. | 280/728.3 |

FOREIGN PATENT DOCUMENTS

| | | | |
|---|---|---|---|
| EP | 0 965 489 A1 | * | 6/1999 |
| JP | 10-100833 A | * | 4/1998 |
| JP | 10-273004 | | 10/1998 |
| JP | 11-189119 | | 7/1999 |

OTHER PUBLICATIONS

Subaru IMPREZA WRX LIMITED 99 INFO web page, Nov. 30, 1999 http://www.j-garage.com/4120.htm.*

* cited by examiner

*Primary Examiner*—Paul N. Dickson
*Assistant Examiner*—Ruth Ilan

(57) ABSTRACT

In a cover with an emblem used for an airbag device, the emblem is structured such that an entire circumference of a rim portion thereof is raised rearwardly in a wall shape to thereby form a side surface, and legs are projected rearwardly from an end of the side surface. Coating in the same type of the color as that of the cover is applied entirely to the base end sides of the legs and the side surface of the emblem. By inserting the legs of the emblem into holes formed in the cover, the emblem is fixed and fitted into a concave section of the cover. An appearance of a peripheral portion of the emblem is extremely improved.

4 Claims, 4 Drawing Sheets

COVER OF AIRBAG DEVICE AND EMBLEM ATTACHED TO THE COVER

BACKGROUND OF THE INVENTION AND RELATED ART STATEMENT

The present invention relates to an airbag device for protecting an occupant on a high-speed vehicle, a cover thereof, and an emblem attached to the cover. In particular, the invention relates to an emblem provided in a cover, which is improved such that a rim of the emblem is not conspicuous, the cover having the aforementioned emblem, and an airbag device including the cover.

As airbag devices which protect occupants from an impact of a vehicle collision, a driver's seat airbag device, a front passenger's seat airbag device and the like have been widely used. The driver's seat airbag device is mounted on a boss section of a steering wheel, and includes an inflator which sprouts a gas; an airbag; and a cover or cover body which covers the airbag folded and stored. In the event of vehicle collision, the airbag is inflated by a pressure of a gas sprouted from the inflator, and the cover body formed of a soft resin is torn to open like a door, so that the airbag is inflated and deployed in front of the occupant.

An ornamental plate called an emblem is often attached to the cover of the airbag device, especially, the cover of the driver's side airbag device. As a structure of attaching the emblem to the cover body, there has been known a structure disclosed, for example, in Japanese Patent Publication (KOKAI) No. 10-273004 and Japanese Patent Publication (KOKAI) No. 11-189119. In this structure, a recess section for fitting the emblem therein is formed on a front surface of the cover, and also, through holes are formed in the concave portion. Then, leg portions projecting from the emblem rearwardly are inserted into the through holes, and distal end sides of the leg portions are bent along an inner surface of the cover.

FIG. 7 is a perspective view showing a structure of attaching the emblem disclosed in Japanese Patent Publication (KOKAI) No. 10-273004. A cover 21 includes a covering section 22 for covering a part of a spoke section and a boss section, in which an airbag is stored, and an attachment wall section 23 in a form of a substantially rectangular cylinder which projects downwardly from a rear surface of the covering section 22. In the covering section 22, tear lines 24a and 24b as a tearing section are formed. The attachment wall section 23 is provided with rivet holes 23a for attaching the cover to a retainer of the airbag device.

At a substantial central portion of the covering section 22 of the cover 21, there is formed a recess section 28 for attaching the emblem, and an emblem 31 is attached to the recess section 28. At a central portion of the recess section 28, a rivet hole 28b, which pierces from a front surface side to a rear surface side, is bored, and also, slit-like holes 28c are formed at plural positions along an outer peripheral portion of the recess section 28.

This emblem 31 includes a plurality of legs 32c projecting in a rearward direction. Openings 32d are formed at the distal end sides of the legs 32c.

The emblem 31 is fitted into the recess section 28 by inserting the legs 32c into the holes 28c. Then, the respective legs 32c are bent in a leg-closing direction to laminate the respective distal ends with each other. Incidentally, in this case, the openings 32d of the respective legs 32c accord concentrically. Then, a rivet 33 is urged to pass through the openings 32d of the respective legs 32c and a rivet hole 28b at a center of the recess section 28, and is attached thereinto. Accordingly, the emblem 31 is fixed to the cover body 21.

As described above, in the structure in which the legs 32c are inserted into the holes 28c and bent along the inner surface of the cover body 21 to thereby attach the emblem 31, especially in case a side surface of the emblem including the legs 32c has a light color or a metallic surface (metallic gross surface), deep or front portions of the legs 32c inserted into the holes 28c are recognized visually, so that an appearance or beauty of the emblem is deteriorated.

Therefore, a coating with the same type of color is applied to the legs 32c, so that a conspicuousness of the legs 32c is solved. However, on the other hand, rim portions 32b of the emblem between the legs 32c become conspicuous, resulting in causing another bad impression. Namely, the rim portions 32b have metallic surfaces while the legs 32c have coated surfaces. Thus, a space between the emblem 31 and a stepped surface of the recess section 28 along the rim portion 32b is seen relatively brightly due to polish, while the portions of the aforementioned space around the holes 28c are seen as a non-polish surface. Accordingly, an unevenness in shining and tone appears in a peripheral direction of the emblem, resulting in causing a bad impression on the appearance.

The present invention has been made to solve the aforementioned problem in the prior art, and an object of the invention is to provide an emblem which is excellent in appearance in which a space between the emblem and a stepped surface of the cover body is well matched, and to provide a cover using the emblem, and an airbag device including the cover.

Further objects and advantages of the invention will be apparent from the following description of the invention.

SUMMARY OF THE INVENTION

To achieve the aforementioned object, the present invention provides an emblem provided on an outer surface of a cover of an airbag device. The emblem is formed of a main plate disposed on the outer surface of the cover body; and attachment legs projecting in a direction of a rear side of the emblem from an outer rim portion of the main plate. At least outer surfaces of base end sides of the legs have the same type of color as that of at least a rim portion at a rear side of a side surface of the main plate.

The present invention also provides a cover in which the emblem as stated above is attached on the outer surface of the cover. The cover includes a concave portion provided on the outer surface of the cover, and holes piercing the cover and provided along a stepped surface of the concave portion. In the cover with the emblem, the legs of the emblem are inserted into the holes of the cover, and the legs are bent at an inner side of the cover.

An airbag of the invention includes the cover with the emblem described above.

In the emblem, the cover and the airbag device of the invention described above, since at least the outer surfaces of the legs at the base end sides thereof have the same type of the color as that of at least the rim portion of the side surface of the emblem at the rear side, the space between the side surface of the emblem and the stepped surface of the concave portion of the cover body has a substantially equal tone in the circumferential direction of the emblem, so that the beauty or appearance of the cover body is extremely improved.

DETAILED DESCRIPTION OF PREFERRED EMBODIMENTS

Figure 1A:
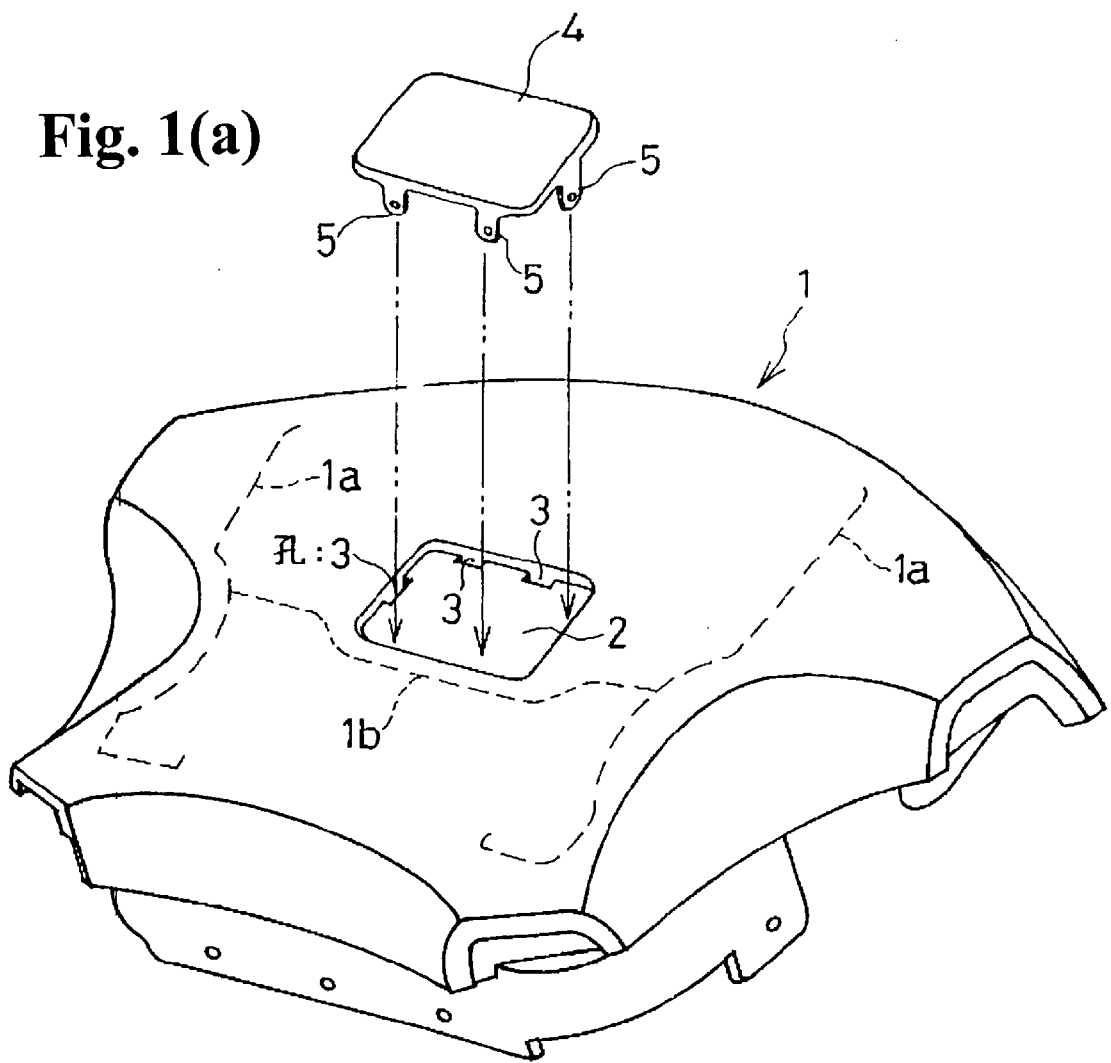
FIG. 1(a) is an exploded perspective view of a cover with an emblem according to an embodiment of the present invention.
Figure 1B:
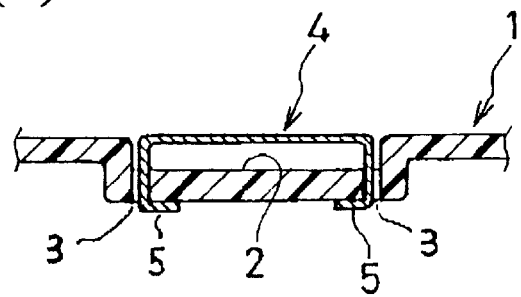
FIG. 1(b) is a cross sectional view of a central portion of the cover showing an attachment condition of the emblem.
Figure 2:
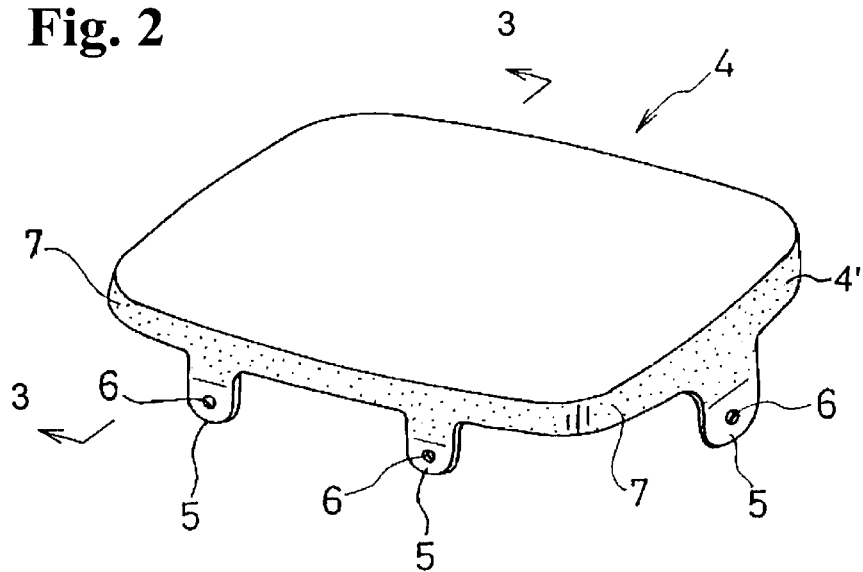
FIG. 2 is a perspective view of the cover.
Figure 3:
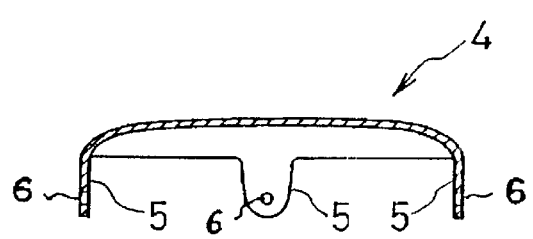
FIG. 3 is a cross sectional view taken along line 3—3 in FIG. 2.

Hereunder, embodiments of the invention will be explained with reference to the attached drawings. FIG. 1(a) is an exploded perspective view of a cover with an emblem according to an embodiment of the invention; FIG. 1(b) is a cross sectional view of a central portion of the cover showing an attachment condition of the emblem; FIG. 2 is a perspective view of the cover; and FIG. 3 is a cross sectional view taken along line 3—3 in FIG. 2.

A cover 1 is a module cover of a driver's seat airbag device, and as generally known, the cover 1 is disposed at a center of a steering wheel to face an occupant on a driver's seat, or driver.

The cover 1 is formed by, for example, injection molding of a thermoplastic synthetic resin. An inner surface of the cover 1 is provided with tear lines 1a and 1b, and the cover 1 is torn to open along the tear lines 1a and 1b in case the airbag is inflated. On a front surface of the cover 1, there is formed a concave section 2 for attaching an emblem 4.

Although the emblem 4 has a substantially rectangular shape and the concave section 2 has the same shape in this embodiment, it is needless to say that the shape of the emblem is not limited to the above. Along a stepped surface of the concave section 2, holes 3 penetrating to a rear side of the cove body 1 are bored, and legs 5 of the emblem 4 are inserted into the holes 3.

The emblem 4 is structured such that an entire peripheral portion thereof is raised rearwardly in a wall form to thereby form a side surface or portion 4', and the legs 5 are projected rearwardly from a rear end of the side surface (end at the rear side). Although six legs 5 and six holes 3 are provided, it can be clearly understood that the number of the legs and the holes may be changed.

In this embodiment, the emblem 4 is a metallic plate, such as aluminum, which is processed, and the legs 5 are formed as tongue-like pieces formed of thin plates. The legs 5 are provided with apertures 6.

In this embodiment, a coating with the same type of color as that of the cover 1 is applied to the base end sides of the legs and the entire side surface of the emblem 4. Incidentally, in general, the color of the cover 1 used to be black, dark brown, dark blue, dark green or the like in many cases. However, in recent years, pastel or mild colors have been gradually used for the cover 1.

In order to attach the emblem 4 to the cover 1, by inserting the legs 5 of the emblem 4 into the holes 3, the emblem 4 is fitted into the concave section 2, and distal end sides of the legs 5 are bent along the inner surface of the cover 1. Then, convex portions, not shown, provided on the rear surface of the cover 1 are subjected to heat softening to cover the distal ends of the legs 5.

In the cover 1 to which the emblem 4 is attached as described above, the base end sides of the legs 5 and the side surface of the emblem 4 are entirely coated in the same type of the color as that of the cover 1, so that the holes 3 do not become conspicuous. Furthermore, an appearance of the side surface of the emblem in the peripheral direction of the emblem 4 as a whole becomes uniform, so that the emblem 4 looks extremely well. Incidentally, the coating can be applied to the entire portions of the legs 5, or as shown in the figures, the coating can be applied only to the base end sides (preferably, the portions to be disposed in the holes 3) of the legs 5.

Incidentally, a design of the front surface (upper surface) of the emblem 4 can be selected as desired, and decoration, such as various kinds of coating or work, can be applied to the emblem 4.

Figure 4:
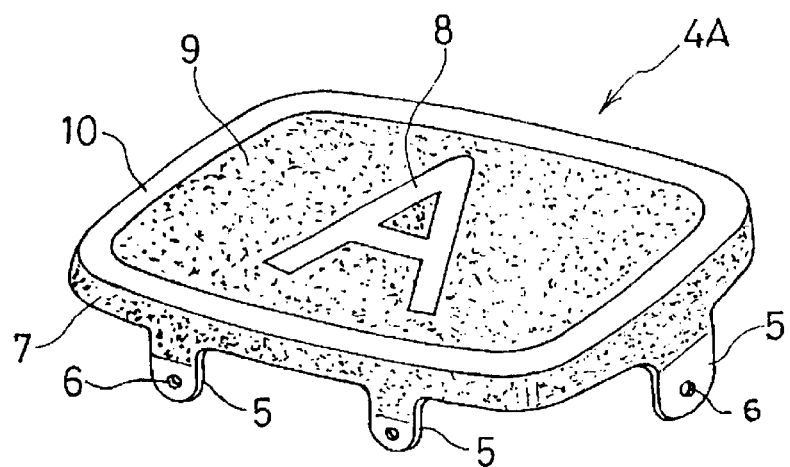
FIG. 4 is a perspective view of an emblem according to another embodiment of the invention.

FIG. 4 shows an example of a design on the upper surface of the emblem, and a coating 9 is applied on the upper surface of the emblem such that an appropriate letter or mark (letter "A" in FIG. 4) is shown as the metallic surface. A periphery of the coating 9 is slightly retreated relative to a periphery of the front surface of the emblem 4A, and a metallic surface 10 is shown along the periphery of the front surface of the emblem 4A.

Figure 5:
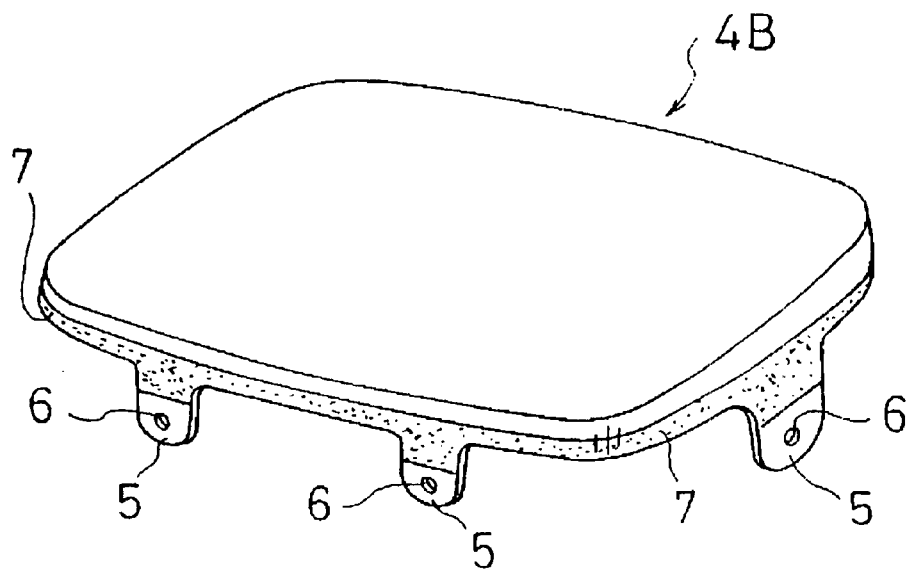
FIG. 5 is a perspective view of an emblem according to a still another embodiment of the invention.
Figure 6:
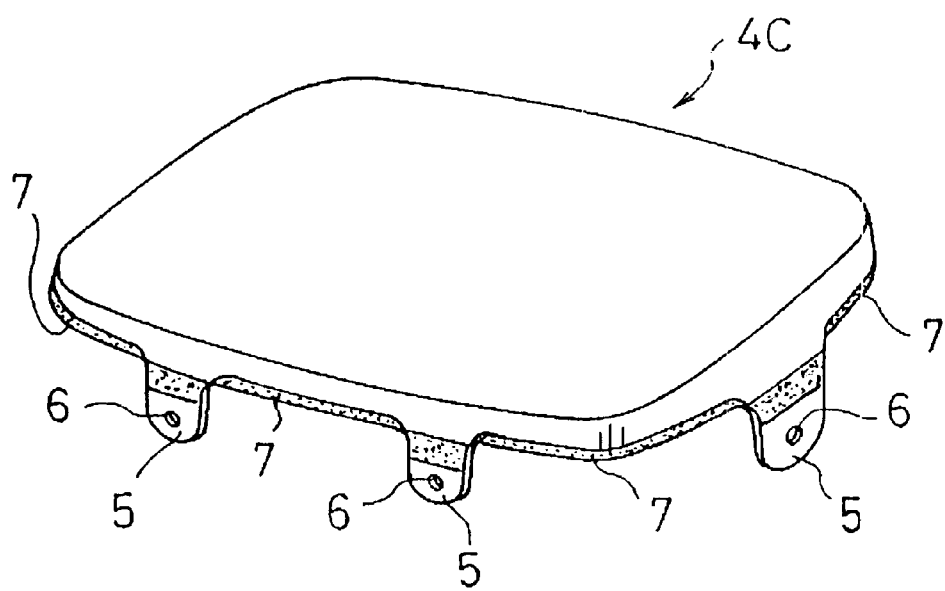
FIG. 6 is a perspective view of an emblem according to a still further embodiment of the invention.
Figure 7:
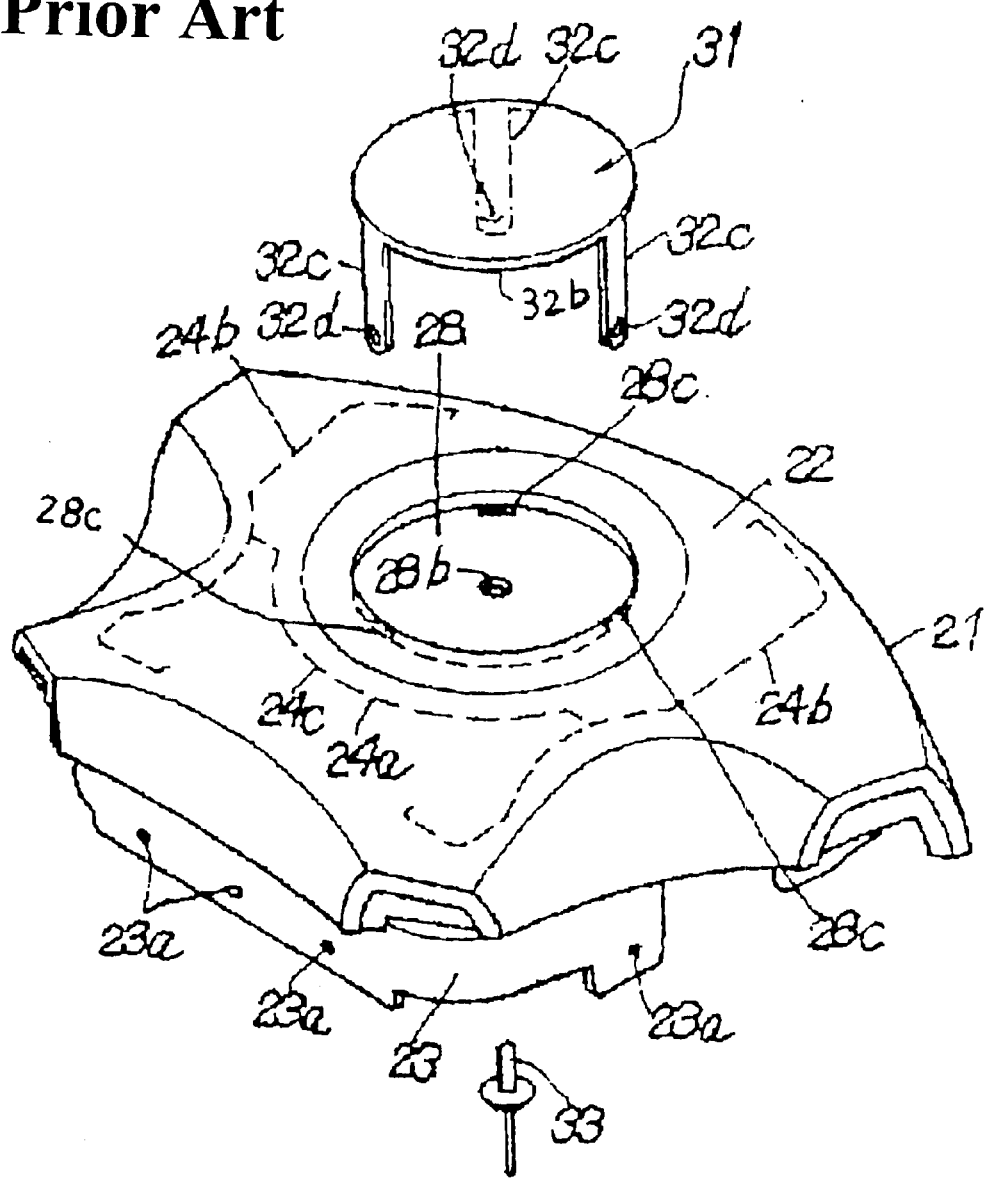
FIG. 7 is an exploded perspective view of a conventional cover with a emblem.

Although the coating is respectively applied to the entire side surfaces of the emblems 4 and 4A in the above embodiments, as shown in FIG. 5, coating or dark color portion may be applied only to an edge portion 7 at the rear side of the emblem in the side surface thereof. Also, as shown in FIG. 6, coating or dark color portion can be applied to the legs 5 and the edge portion of the side surface of the emblem between the respective legs 5. According to the emblems 4A, 4B and 4C respectively shown in FIGS. 4, 5 and 6, the cover with the emblem which looks excellent can be manufactured, as in the emblem 4.

The cover as described above is incorporated into the airbag device as in the conventional cover.

As described above, according to the present invention, a cover with an emblem, in which an appearance of a peripheral portion of the emblem is excellent, and the airbag device including the cover as stated above can be provided.

While the invention has been explained with reference to the specific embodiments of the invention, the explanation is illustrative and the invention is limited only by the appended claims.

What is claimed is:

1. An emblem provided on an outer surface of a cover of an airbag device, comprising:

a main plate disposed on the outer surface of the cover and having a front surface, a peripheral portion of the front surface with a metallic surface, and a side portion with a rim portion at a rear side of the main plate, said metallic surface formed at the peripheral portion extending to the side portion, a coating formed at the rim portion on the rear side of the side portion adjacent the metallic surface, and attachment legs projecting rearwardly from an edge of the rim portion of the main plate and having base end sides with outer surfaces, said outer surfaces of the base end sides of the attachment legs having a color same as that of the coating formed at the rim portion at the rear side of the side portion of the main plate.

2. A cover of an airbag device, comprising:

a cover portion having an outer surface, a concave section provided at the outer surface of the cover portion and having a stepped surface, holes formed in the concave portion along the stepped surface thereof, an emblem attached to the cover portion and including a main plate disposed in the concave section on the outer surface of the cover portion; a flat side portion extending rearwardly from the main plate and having a rim portion at a rear side of the side portion; and attachment legs projecting directly rearwardly from an edge of the rim portion of the side portion, said attachment legs being disposed in the holes and fixed to the cover portion and having base end sides with outer surface adjacent to the rim portion, and a coating formed on the outer surface of the base end sides of the attachment legs and the rim portion of the side portion, said coating having a color same as that of the cover portion.

3. An airbag device provided with the cover according to claim 2.

4. A cover according to claim 2, wherein said side portion of the emblem extends substantially perpendicularly to the main plate and directly faces the stepped surface of the concave section.

* * * * *